(12) United States Patent
Wachtfogel et al.

(10) Patent No.: US 8,397,255 B2
(45) Date of Patent: Mar. 12, 2013

(54) ADVANCED TELEVISION SYSTEM

(75) Inventors: Reuven Wachtfogel, Jerusalem (IL); David Richardson, Ramat Hasharon (IL); Shlomo Kipnis, Jerusalem (IL); Jonathan Maissel, Jerusalem (IL); Yossef Tsuria, Jerusalem (IL); Yonatan Silver, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 1247 days.

(21) Appl. No.: 11/599,216

(22) Filed: Nov. 14, 2006

(65) Prior Publication Data

US 2007/0067800 A1  Mar. 22, 2007

Related U.S. Application Data

(63) Continuation of application No. 09/515,118, filed on Feb. 24, 2000, which is a continuation of application No. PCT/IL99/00344, filed on Jun. 23, 1999.

(30) Foreign Application Priority Data

Jun. 29, 1998  (IL) .......................................... 125141

(51) Int. Cl.
    *H04N 7/10* (2006.01)
    *H04N 9/80* (2006.01)
(52) U.S. Cl. .............................. 725/34; 725/36; 386/249
(58) Field of Classification Search .................... 725/32, 725/34, 35, 36; 386/239, 248, 249, 250
    See application file for complete search history.

(56) References Cited

U.S. PATENT DOCUMENTS

| 3,341,833 A | 9/1967 | Jones |
| 3,645,539 A | 2/1972 | Jenkins |
| 3,682,363 A | 8/1972 | Hull |
| 4,080,626 A | 3/1978 | Hurst et al. |
| 4,107,734 A | 8/1978 | Percy et al. |
| 4,272,787 A | 6/1981 | Michael et al. |
| 4,283,735 A | 8/1981 | Jagger |

(Continued)

FOREIGN PATENT DOCUMENTS

| DE | 100 44 051 A1 | 3/2002 |
| EP | 0 584 991 A2 | 3/1994 |

(Continued)

OTHER PUBLICATIONS

Angus et al., "Embedding the 2D Interaction Metaphor in a Real 3D Virtual Environment" (SPIE vol. 2409 pp. 282-293, 1995).

(Continued)

*Primary Examiner* — James R Sheleheda
(74) *Attorney, Agent, or Firm* — Husch Blackwell LLP

(57) ABSTRACT

A digital television recording method comprising: broadcasting a television program associated with a broadcaster set of parameters enabling access to a first set of predetermined portions of the program; operating an agent for determining whether to record the program and for associating with the program, upon recording of the program, an agent set of parameters enabling access to a second set of predetermined portions of the program; storing the program together with the broadcaster set of parameters and the agent set of parameters to generate an addressable program; retrieving at least a portion of the addressable program; displaying the at least a portion of the addressable program to a user; receiving from the user a user set of parameters enabling access to a third set of predetermined portions of the addressable program; editing the addressable program to include the user set of parameters enabling access to the third set of predetermined portions of the addressable program thereby generating an edited addressable program; and storing the edited addressable program.

22 Claims, 5 Drawing Sheets

U.S. PATENT DOCUMENTS

| | | | |
|---|---|---|---|
| 4,308,554 A | 12/1981 | Percy et al. |
| 4,319,286 A | 3/1982 | Hanpachern |
| 4,408,309 A | 10/1983 | Kiesling et al. |
| 4,430,676 A | 2/1984 | Johnson |
| 4,445,195 A | 4/1984 | Yamamoto |
| 4,488,179 A | 12/1984 | Kruger et al. |
| 4,530,048 A | 7/1985 | Proper |
| 4,602,279 A | 7/1986 | Freeman |
| 4,633,331 A | 12/1986 | McGrady et al. |
| 4,677,466 A | 6/1987 | Lert, Jr. et al. |
| 4,706,121 A | 11/1987 | Young |
| 4,745,468 A | 5/1988 | Von Kohorn |
| 4,768,095 A | 8/1988 | Wada et al. |
| 4,774,582 A | 9/1988 | Hakamada et al. |
| 4,777,531 A | 10/1988 | Hakamada et al. |
| 4,876,592 A | 10/1989 | Von Kohorn |
| 4,876,670 A | 10/1989 | Nakabayashi et al. |
| 4,885,775 A | 12/1989 | Lucas |
| 4,888,638 A | 12/1989 | Bohn |
| 4,891,715 A | 1/1990 | Levy |
| 4,905,080 A | 2/1990 | Watanabe et al. |
| 4,908,713 A | 3/1990 | Levine |
| 4,924,732 A | 5/1990 | Hoskins et al. |
| 4,926,255 A | 5/1990 | Von Kohorn |
| 4,930,158 A | 5/1990 | Vogel |
| 4,963,866 A | 10/1990 | Duncan |
| 4,963,994 A | 10/1990 | Levine |
| 4,963,995 A | 10/1990 | Lang |
| 4,977,455 A | 12/1990 | Young |
| 4,991,033 A | 2/1991 | Takeshita |
| 5,021,875 A | 6/1991 | Scheffler |
| 5,027,400 A | 6/1991 | Baji et al. |
| 5,034,807 A | 7/1991 | Von Kohorn |
| 5,038,211 A | 8/1991 | Hallenbeck |
| 5,046,093 A | 9/1991 | Wachob |
| 5,057,915 A | 10/1991 | Von Kohorn |
| 5,063,453 A | 11/1991 | Yoshimura et al. |
| 5,128,752 A | 7/1992 | Von Kohorn |
| 5,151,789 A | 9/1992 | Young |
| 5,189,517 A | 2/1993 | Ohara |
| 5,191,423 A | 3/1993 | Yoshida |
| 5,223,924 A | 6/1993 | Strubbe |
| 5,227,874 A | 7/1993 | Von Kohorn |
| 5,231,494 A | 7/1993 | Wachob |
| 5,235,643 A | 8/1993 | Anderson et al. |
| 5,241,428 A | 8/1993 | Goldwasser et al. |
| 5,249,044 A | 9/1993 | Von Kohorn |
| 5,293,357 A | 3/1994 | Hallenbeck |
| 5,319,455 A | 6/1994 | Hoarty et al. |
| 5,323,240 A | 6/1994 | Amano et al. |
| 5,325,183 A | 6/1994 | Rhee |
| 5,353,121 A | 10/1994 | Young et al. |
| 5,371,551 A | 12/1994 | Logan et al. |
| 5,373,440 A | 12/1994 | Cohen et al. |
| 5,390,027 A | 2/1995 | Henmi et al. |
| 5,396,545 A | 3/1995 | Nair et al. |
| 5,410,326 A | 4/1995 | Goldstein |
| 5,410,344 A | 4/1995 | Graves et al. |
| 5,412,416 A | 5/1995 | Nemirofsky |
| 5,414,773 A | 5/1995 | Handelman |
| 5,436,676 A | 7/1995 | Pint et al. |
| 5,438,423 A | 8/1995 | Lynch et al. |
| 5,440,336 A | 8/1995 | Buhro et al. |
| 5,444,499 A | 8/1995 | Saitoh |
| 5,446,488 A | 8/1995 | Vogel |
| 5,446,919 A | 8/1995 | Wilkins |
| 5,465,113 A | 11/1995 | Gilboy |
| 5,477,262 A | 12/1995 | Banker et al. |
| 5,479,266 A | 12/1995 | Young et al. |
| 5,479,268 A | 12/1995 | Young et al. |
| 5,479,302 A | 12/1995 | Haines |
| 5,481,294 A | 1/1996 | Thomas et al. |
| 5,481,752 A | 1/1996 | Suzuki et al. |
| 5,483,276 A | 1/1996 | Brooks et al. |
| 5,483,278 A | 1/1996 | Strubbe et al. |
| 5,488,423 A | 1/1996 | Walkingshaw et al. |
| 5,488,571 A | 1/1996 | Jacobs et al. |
| 5,491,795 A | 2/1996 | Beaudet et al. |
| 5,504,519 A | 4/1996 | Remillard |
| 5,508,815 A | 4/1996 | Levine |
| 5,508,940 A | 4/1996 | Rossmere et al. |
| 5,515,106 A | 5/1996 | Chaney et al. |
| 5,517,187 A | 5/1996 | Bruwer et al. |
| 5,519,448 A | 5/1996 | Nagasawa et al. |
| 5,524,195 A | 6/1996 | Clanton et al. |
| 5,526,401 A | 6/1996 | Roach, Jr. et al. |
| 5,530,469 A | 6/1996 | Garfinkle |
| 5,532,735 A | 7/1996 | Blahut et al. |
| 5,534,911 A | 7/1996 | Levitan |
| 5,535,147 A | 7/1996 | Jacobs et al. |
| 5,539,449 A | 7/1996 | Blahut et al. |
| 5,539,822 A | 7/1996 | Lett |
| 5,544,354 A | 8/1996 | May et al. |
| 5,550,576 A | 8/1996 | Klosterman |
| 5,550,681 A | 8/1996 | Mazarac |
| 5,552,837 A | 9/1996 | Mankovitz |
| 5,555,308 A | 9/1996 | Levien |
| 5,556,107 A | 9/1996 | Carter |
| 5,557,538 A | 9/1996 | Retter et al. |
| 5,561,543 A | 10/1996 | Ogawa |
| 5,561,708 A | 10/1996 | Remillard |
| 5,561,709 A | 10/1996 | Remillard |
| 5,564,088 A | 10/1996 | Saitoh |
| 5,566,069 A | 10/1996 | Clark, Jr. et al. |
| 5,566,353 A | 10/1996 | Cho et al. |
| 5,568,272 A | 10/1996 | Levine |
| 5,583,560 A | 12/1996 | Florin et al. |
| 5,585,858 A | 12/1996 | Harper et al. |
| 5,585,865 A | 12/1996 | Amano et al. |
| 5,619,250 A | 4/1997 | McClellan et al. |
| 5,619,251 A | 4/1997 | Kuroiwa et al. |
| 5,621,456 A | 4/1997 | Florin et al. |
| 5,621,473 A | 4/1997 | Hill |
| 5,623,690 A | 4/1997 | Palmer et al. |
| 5,629,733 A | 5/1997 | Youman et al. |
| 5,635,978 A | 6/1997 | Alten et al. |
| 5,635,989 A | 6/1997 | Rothmuller |
| 5,640,192 A | 6/1997 | Garfinkle |
| D382,878 S | 8/1997 | Erlin |
| 5,654,747 A | 8/1997 | Ottesen et al. |
| 5,657,072 A | 8/1997 | Aristides et al. |
| 5,659,366 A | 8/1997 | Kerman |
| 5,664,046 A | 9/1997 | Abecassis |
| 5,664,948 A | 9/1997 | Dimitriadis et al. |
| 5,666,645 A | 9/1997 | Thomas et al. |
| 5,671,226 A | 9/1997 | Murakami et al. |
| 5,675,390 A | 10/1997 | Schindler et al. |
| 5,675,524 A | 10/1997 | Bernard |
| 5,689,286 A | 11/1997 | Wugofski |
| 5,701,383 A | 12/1997 | Russo et al. |
| 5,703,997 A | 12/1997 | Kitamura et al. |
| 5,708,840 A | 1/1998 | Kikinis et al. |
| 5,710,605 A | 1/1998 | Nelson |
| 5,715,315 A | 2/1998 | Handelman |
| 5,717,814 A | 2/1998 | Abecassis |
| 5,717,923 A | 2/1998 | Dedrick |
| 5,721,815 A | 2/1998 | Ottesen et al. |
| 5,721,827 A | 2/1998 | Logan et al. |
| 5,721,878 A | 2/1998 | Ottesen et al. |
| 5,727,060 A | 3/1998 | Young |
| 5,728,998 A | 3/1998 | Novis et al. |
| 5,732,216 A | 3/1998 | Logan et al. |
| 5,737,029 A | 4/1998 | Ohkura et al. |
| 5,737,527 A | 4/1998 | Shiels et al. |
| 5,751,883 A | 5/1998 | Ottesen et al. |
| 5,752,244 A | 5/1998 | Rose et al. |
| 5,754,773 A | 5/1998 | Ozden |
| 5,758,257 A | 5/1998 | Herz et al. |
| 5,758,259 A | 5/1998 | Lawler |
| 5,759,101 A | 6/1998 | Von Kohorn |
| 5,760,821 A | 6/1998 | Ellis et al. |
| 5,761,601 A | 6/1998 | Nemirofsky et al. |
| 5,761,648 A | 6/1998 | Golden et al. |
| 5,767,893 A | 6/1998 | Chen et al. |
| 5,767,896 A | 6/1998 | Nemirofsky |
| 5,774,186 A | 6/1998 | Brodsky et al. |
| 5,786,845 A | 7/1998 | Tsuria |

| | | |
|---|---|---|
| 5,793,438 A | 8/1998 | Bedard |
| 5,801,747 A | 9/1998 | Bedard |
| 5,805,974 A | 9/1998 | Hite et al. |
| 5,819,092 A | 10/1998 | Ferguson et al. |
| 5,828,839 A | 10/1998 | Moncreiff |
| 5,855,008 A | 12/1998 | Goldhaber et al. |
| 5,867,799 A | 2/1999 | Lang et al. |
| 5,892,536 A | 4/1999 | Logan et al. |
| 5,907,322 A | 5/1999 | Kelly et al. |
| 5,911,029 A | 6/1999 | Sakaguchi et al. |
| 5,918,014 A | 6/1999 | Robinson |
| 5,937,392 A | 8/1999 | Alberts |
| 5,940,073 A | 8/1999 | Klosterman et al. |
| 5,945,988 A | 8/1999 | Williams et al. |
| 5,946,664 A | 8/1999 | Ebisawa |
| 5,970,469 A | 10/1999 | Scroggie et al. |
| 5,973,683 A | 10/1999 | Cragun et al. |
| 5,977,964 A | 11/1999 | Williams et al. |
| 5,978,013 A | 11/1999 | Jones et al. |
| 5,986,692 A | 11/1999 | Logan et al. |
| 5,991,735 A | 11/1999 | Gerace |
| 5,999,688 A | 12/1999 | Iggulden et al. |
| 6,006,257 A | 12/1999 | Slezak |
| 6,014,184 A | 1/2000 | Knee et al. |
| 6,018,612 A | 1/2000 | Thomason et al. |
| 6,020,883 A | 2/2000 | Herz et al. |
| 6,044,403 A | 3/2000 | Gerzberg et al. |
| 6,057,872 A | 5/2000 | Candelore |
| 6,064,978 A | 5/2000 | Gardner et al. |
| 6,070,145 A | 5/2000 | Pinsley et al. |
| 6,075,971 A | 6/2000 | Williams et al. |
| 6,078,328 A | 6/2000 | Schumann et al. |
| 6,078,348 A | 6/2000 | Klosterman et al. |
| 6,088,722 A | 7/2000 | Herz et al. |
| 6,097,383 A | 8/2000 | Gaughan et al. |
| 6,112,186 A | 8/2000 | Bergh et al. |
| 6,119,098 A | 9/2000 | Guyot et al. |
| 6,128,009 A | 10/2000 | Ohkura et al. |
| 6,133,909 A | 10/2000 | Schein et al. |
| 6,134,532 A | 10/2000 | Lazarus et al. |
| 6,151,059 A | 11/2000 | Schein et al. |
| 6,160,570 A | 12/2000 | Sitnik |
| 6,172,712 B1 | 1/2001 | Beard |
| 6,177,931 B1 * | 1/2001 | Alexander et al. ............... 725/52 |
| 6,208,801 B1 | 3/2001 | Kambayashi et al. |
| 6,236,801 B1 | 5/2001 | Engle et al. |
| 6,247,176 B1 | 6/2001 | Schein et al. |
| 6,272,467 B1 | 8/2001 | Durand et al. |
| 6,285,987 B1 | 9/2001 | Roth et al. |
| 6,286,140 B1 | 9/2001 | Ivanyi |
| 6,304,715 B1 | 10/2001 | Abecassis |
| 6,324,338 B1 | 11/2001 | Wood et al. |
| 6,373,534 B1 | 4/2002 | Yasuki et al. |
| 6,377,745 B2 | 4/2002 | Akiba et al. |
| 6,405,370 B1 | 6/2002 | Jarrell |
| 6,438,752 B1 | 8/2002 | McClard |
| 6,446,261 B1 | 9/2002 | Rosser |
| 6,449,632 B1 | 9/2002 | David et al. |
| 6,490,000 B1 * | 12/2002 | Schaefer et al. ............... 348/553 |
| 6,588,015 B1 | 7/2003 | Eyer et al. |
| 6,601,074 B1 | 7/2003 | Liebenow |
| 6,614,987 B1 | 9/2003 | Ismail et al. |
| 6,654,547 B1 | 11/2003 | Maeda et al. |
| 6,681,393 B1 | 1/2004 | Bauminger et al. |
| 6,698,020 B1 * | 2/2004 | Zigmond et al. ............... 725/34 |
| 6,727,914 B1 | 4/2004 | Gutta |
| 6,792,618 B1 | 9/2004 | Bendinelli et al. |
| 6,934,964 B1 | 8/2005 | Schaffer et al. |
| 7,055,166 B1 | 5/2006 | Logan et al. |
| 2001/0007147 A1 | 7/2001 | Goldschmidt Iki et al. |
| 2001/0016944 A1 | 8/2001 | Terakado et al. |
| 2001/0049820 A1 | 12/2001 | Barton |
| 2002/0053084 A1 | 5/2002 | Escobar et al. |
| 2002/0056098 A1 | 5/2002 | White |
| 2002/0059094 A1 | 5/2002 | Hosea et al. |
| 2002/0059606 A1 | 5/2002 | Kikinis et al. |
| 2002/0077880 A1 | 6/2002 | Gordon et al. |
| 2002/0083468 A1 | 6/2002 | Dudkiewicz |
| 2002/0087979 A1 | 7/2002 | Dudkiewicz et al. |
| 2002/0087987 A1 | 7/2002 | Dudkiewicz et al. |
| 2002/0097265 A1 | 7/2002 | Kurapati et al. |
| 2002/0100046 A1 | 7/2002 | Dudkiewicz |
| 2002/0104081 A1 | 8/2002 | Candelore et al. |
| 2002/0104087 A1 | 8/2002 | Schaffer et al. |
| 2002/0116710 A1 | 8/2002 | Schaffer et al. |
| 2002/0120943 A1 | 8/2002 | Seto et al. |
| 2002/0144262 A1 | 10/2002 | Plotnick et al. |
| 2002/0176702 A1 | 11/2002 | Frantz |
| 2002/0178447 A1 * | 11/2002 | Plotnick et al. ............... 725/36 |
| 2003/0093792 A1 | 5/2003 | Labeeb et al. |
| 2003/0154128 A1 | 8/2003 | Liga et al. |
| 2004/0028226 A1 | 2/2004 | Saar et al. |
| 2004/0103429 A1 | 5/2004 | Carlucci et al. |
| 2005/0172317 A1 | 8/2005 | Jeong et al. |

FOREIGN PATENT DOCUMENTS

| | | |
|---|---|---|
| EP | 0 656 728 A2 | 6/1995 |
| EP | 0 669 760 A2 | 8/1995 |
| EP | 0 680 214 A2 | 11/1995 |
| EP | 0 735 754 A2 | 10/1996 |
| EP | 0 847 156 A2 | 6/1998 |
| EP | 0 594 241 B1 | 5/1999 |
| EP | 0 967 804 A2 | 12/1999 |
| EP | 0 606 857 B1 | 4/2000 |
| EP | 1 316 213 B1 | 11/2004 |
| GB | 2 192 297 A | 1/1988 |
| GB | 2 210 526 A | 6/1989 |
| GB | 2 302 635 A | 1/1997 |
| GB | 2 343 075 | 4/2000 |
| GB | 2 348 530 | 10/2000 |
| JP | 05174450 | 7/1993 |
| JP | 2001135023 | 5/2001 |
| WO | WO 90/00847 | 1/1990 |
| WO | WO 91/07050 | 5/1991 |
| WO | WO 92/04801 | 3/1992 |
| WO | WO 92/22983 | 12/1992 |
| WO | WO 94/14284 | 6/1994 |
| WO | WO 95/01056 | 1/1995 |
| WO | WO 95/011056 | 1/1995 |
| WO | WO 95/31069 | 11/1995 |
| WO | WO 96/15603 | 5/1996 |
| WO | WO 96/33579 | 10/1996 |
| WO | WO 96/37058 | 11/1996 |
| WO | WO 97/02537 | 1/1997 |
| WO | WO 97/03521 | 1/1997 |
| WO | WO 97/06531 | 2/1997 |
| WO | WO 97/12486 | 4/1997 |
| WO | WO 97/17774 | 5/1997 |
| WO | WO 97/20279 | 6/1997 |
| WO | WO 97/27705 | 7/1997 |
| WO | WO 97/29592 | 8/1997 |
| WO | WO 97/48230 | 12/1997 |
| WO | WO 97/50250 | 12/1997 |
| WO | WO 98/08192 | 2/1998 |
| WO | WO 98/16062 | 4/1998 |
| WO | WO 98/28869 | 7/1998 |
| WO | WO 98/37696 | 8/1998 |
| WO | WO 99/01984 | 1/1999 |
| WO | WO 99/03275 | 1/1999 |
| WO | WO 99/43111 | 8/1999 |
| WO | WO 99/45702 | 9/1999 |
| WO | WO 00/01149 | 1/2000 |
| WO | WO 00/04708 | 1/2000 |
| WO | WO 00/07367 | 2/2000 |
| WO | WO 01/47279 A2 | 6/2001 |
| WO | WO 01/52541 A1 | 7/2001 |
| WO | WO 01/60064 | 8/2001 |
| WO | WO 03/067394 A2 | 8/2003 |
| WO | WO 03/069457 | 8/2003 |
| WO | WO 03/077112 | 9/2003 |

OTHER PUBLICATIONS

Ceccarelli, M.P.; "Metadata for Broadcasting" (MPEG-7 Workshop, XP.002117667, 1998).

Fah-Chun Cheong; Internet Agents: Spiders, Wanderers, Brokers, 'Bots, pp. 4-35, 387-390 (New Riders 1996).

Gessler et al.; "PDAs as mobile WWW Browsers" (Computer Networks and ISDN Systems, vol. 28, pp. 53-59, 1995).
Gilbert et al.; "The Role of Intelligent Agents in the Information Infrastructure" (www.Raleigh.ibm.com/iagptc2.html).
Kageyama et al.; "A Free Time-Shift DVD Video Recorder" (IEEE Transactions on Consumer Electronics, vol. 43, No. 3, p. 469-73, Aug. 1997).
Kato et al.; "A Portable Communication Terminal for Novices and its User Interface Software" (IEICE Trans Commun., vol. E78-B, No. 10, pp. 1387-1393, Oct. 1995).
Maissel, John; "Double Agent Infopack: A Collection of Papers Relating to Phillip's Double Agent System" (May 1998).
Matsukura et al.; "Multimedia Notebook: Information Capturing Technologies for Portable Computers" (IEICE Trans Commun., vol. E78-B, No. 10, pp. 1381-1385 (Oct. 1995).
Persoon, Eric H.J.; "Smash—a concept for advanced use of storage in the home" (presentation at IMAGINA '98, Mar. 4-6, 1998).
Petersen, Karin; "Tcl/Tk for a Personal Digital Assistant" (Usenix, Very High Languages Symposium Proceedings, pp. 41-55, Oct. 26-28, 1994).
Zhang et al.; "Automatic parsing and indexing of news video" (Multimedia Systems 2:256-265, 1995).
Zhang et al.; "Automatic partitioning of a full-motion video" (Multimedia Systems 1:10-28, 1993).
"Applications for Home Storage Based Systems" (The Digital Audio-Visual Council, Bethesda, May 11-13, 1998, Source: Applications TC, DAVIC/TC/98/05/001).
"Intelligent Agents" IBM Intelligent Agents Home Page, www.raleigh.ibm.com./iag/iaghome.html.
"A Survey of Television" (The Economist, p. 3-18, Feb. 12, 1994).
Jan. 14, 2008 EPO Communication re 06018367.0-1247.
May 4, 2008 2008 Office Communication in connection with prosecution of counterpart Israeli patent application (w/English translation).
Sep. 18, 2009 examination report in connection with EP 06018 367.0.
Nov. 9, 2012 Office Action in connection with prosecution of U.S. Appl. No. 12/152,551.
May 26, 2010 Office Communication in connection with EP 09 00 7393.3.
Nov. 17, 2010 Office Action in connection with prosecution of U.S. Appl. No. 12/152,551.
Apr. 20, 2011 Office Action in connection with prosecution of U.S. Appl. No. 12/152,551.
Jun. 13, 2011 Office Action in connection with prosecution of U.S. Appl. No. 12/152,551.
Sep. 23, 2011 Office Action in connection with prosecution of U.S. Appl. No. 12/152,551.
Dec. 2, 2011 Advisory Action in connection with prosecution of U.S. Appl. No. 12/152,551.
Jul. 19, 2012 Office Action in connection with prosecution of U.S. Appl. No. 12/152,551.
May 26, 2010 Office Communication in connection with prosecution of EP 09 007 393.3.
IL 121188/2 as filed.
Aug. 2010 Office Communication in connection with prosecution of IL 203475.
Sep. 29, 2011 Office Communication in connection with prosecution of EP 09 007 393.3.
Jan. 24, 2012 Office Communication in connection with prosecution of EP 10 00 9999.3.
Feb. 22, 2012 Office Communication in connection with prosecution of EP 1 001 0001.5.
Jul. 3, 2012 Office Communication in connection with prosecution of EP 1 001 0001.5.

\* cited by examiner

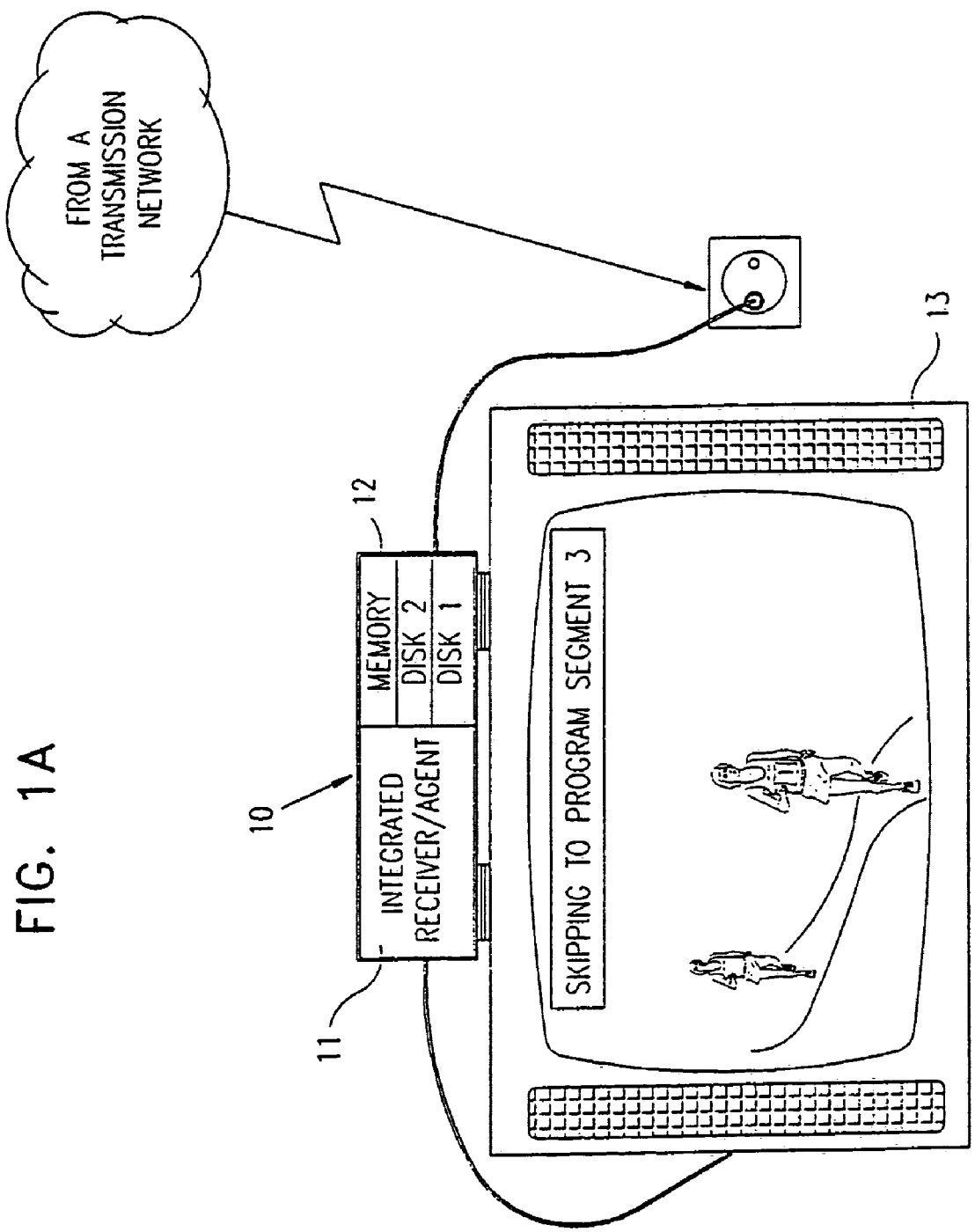

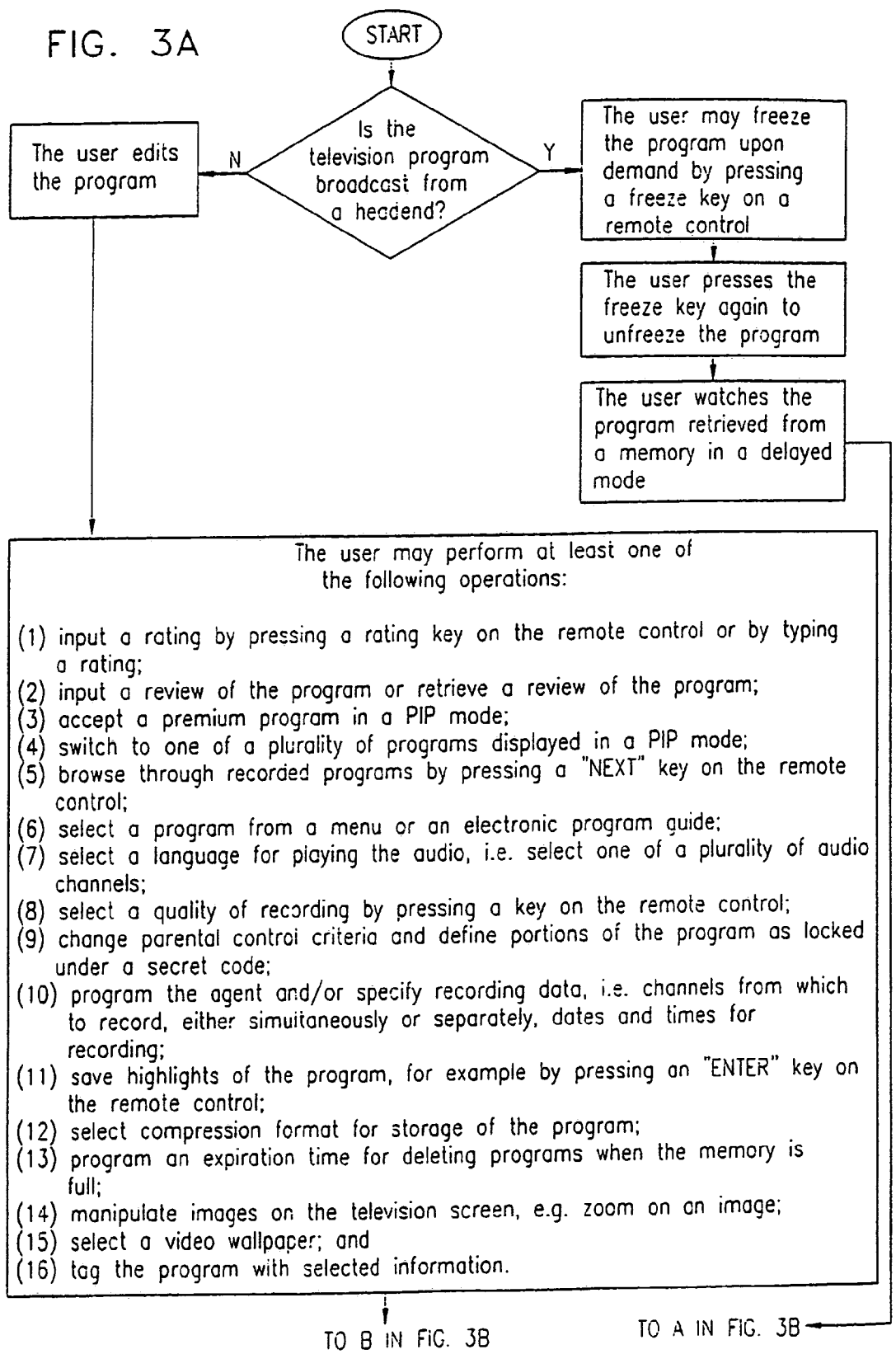

ADVANCED TELEVISION SYSTEM

The present application is a continuation of pending application Ser. No. 09/515,118, filed on 24 Feb. 2000 and entitled Advanced Television System, which is a continuation of Application No. PCT/IL99/00344, filed on 23 Jun. 1999 and entitled Advanced Television System, which was published on 6 Jan. 2000 in the English language with International Publication No. WO 00/01149, and which relies for priority on Israeli patent Application No. 125141, filed 29 Jun. 1998.

FIELD OF THE INVENTION

The present invention relates to digital television recording systems.

BACKGROUND OF THE INVENTION

Today, television programs are recorded at home on low capacity magnetic tape storage devices using video cassette recorders (VCRs). Typically, conventional video cassettes store only three or four hours of good quality movies. Thus, in order to record many programming hours, a user must use several video cassettes.

A conventional VCR is typically a passive recorder since it does not determine what television material to record. Typically, the VCR must be programmed by the user in order to initiate recording, and programming options typically include only selection of a time to begin recording and a time to end recording.

When the user wants to see a portion of a recorded movie, the user must first determine in which cassette the movie is recorded since VCRs do not provide a recording content guide. Although the user may write on each cassette titles of movies recorded therein, most users do not keep track of the movies recorded on their video cassettes. This makes searching of movies in video cassettes difficult.

Even after the user determines which video cassette includes the required movie, the user must rewind the cassette or move forward to find the portion of the movie. Such operations are inconvenient and typically cause wear to the video cassette and several electro-mechanical parts of a VCR thereby resulting in a need for frequent repairs in video laboratories.

Some VCRs also provide an editing function which enables the user to edit a recorded movie. However, editing with a VCR is difficult and requires frequent rewinding or moving forward of video cassettes which, as mentioned above, causes wear to the video cassettes and several electro-mechanical parts of the VCR.

Thus, it is appreciated that a recording and retrieval system which enables easy access to selected portions of stored movies and simple editing of movies will be highly desired.

In a publication titled "Double Agent—Presentation and Filtering Agents for a Digital Television Recording system" by Meuleman et al. of Philips Research, Eindhoven, The Netherlands, dated 18-23 Apr. 1998, there is described a double agent which explores scenarios for automated selection of television programs and their presentation via anthropomorphic interfaces. The double agent operates on data recorded by an experimental digital VCR.

In a publication titled "SMASH—a concept for advanced use of storage at home" by Persoon of Philips Research, Eindhoven, The Netherlands, dated 3 May 1998, the concept of SMASH (Storage for Multimedia Applications and Systems) is described. The main goal of the project is to explore the future possibilities offered on the one hand by the massive amount of new digital services that enter the consumers home and on the other hand the impressive progress of storage technologies that are suitable for home use.

In a publication titled "Mediators—Guides through online TV services" by Kohar et al. of Philips Research, Eindhoven, The Netherlands, dated 3 May 1998, there are described anthropomorphic guides who aid users in selection and navigation to content in interactive television services.

The following US Patents are related to special effects in television: U.S. Pat. Nos. 4,080,626; 4,272,787; 4,768,095; 4,774,582; 4,777,531; 5,519,448; 5,621,473.

Israel Patent Application 121230, submitted 3 Jul. 1997 and corresponding published PCT Application WO 99/01984 both assigned to NDS Limited describe one system for using intelligent agents to customize an electronic program guide (EPG) based on user behavior.

Israel Patent Application 120174, submitted 8 Feb. 1997 and corresponding published UK Patent Application 2,322, 030 both assigned to NDS Limited describes a method for producing and recording a digital data stream and particularly for protecting recording of digital data streams including digital television data.

In a DAVIC (The Digital Audio-Visual Council) publication DAVIC/TC/APP/98/05/001 titled "Applications for Home Storage Based Systems", dated 1 May 1998, there are described a number of applications which can be realized through the provision of home storage systems, made easy to use by appropriate use of content descriptions, markers, links and agent technologies.

The disclosures of all references mentioned above and throughout the present specification are hereby incorporated herein by reference.

SUMMARY OF THE INVENTION

The present invention seeks to provide digital television recording apparatus having a powerful yet simple user interface which enables manipulation of information recorded by the digital television recording apparatus.

In the present invention, television programs are recorded in a high capacity memory based on a continuously updated user profile. The television programs are also presented to a viewer based on the user profile. The television programs include various types of television material, such as programs, commercials, video clips, program guides, data, multimedia information, hypermedia links and teletex. The high capacity memory may include a high capacity hard disk and a high capacity external memory.

A user may either watch broadcast television or programs retrieved from the high capacity memory or link to other networks, such as the Internet. When viewing a program retrieved from the memory, the user has a variety of possibilities to manipulate the program, such as editing, marking and combining highlights in the program, tagging the program for retrieval under determinable conditions, changing parental control criteria and using special features, such as picture-in-picture (PIP). The user also has additional interactive features.

The user may switch from broadcast television to the stored program in a simple way. Additionally, one of the features provided by the digital television recording apparatus is program freezing in which the program is frozen when the user is required to stop watching television, and then automatically recorded in the memory from the moment of freeze. When the user is able to watch television again, the program is retrieved from the memory and the user may resume watching the program in a delayed mode from the moment of freeze.

Storage of television programs makes it possible to treat the programs as computer software programs and thus many advantages arise. Additionally, flexible programming tools may be adapted which are tailored to specific needs of television viewers. There is thus provided in accordance with a preferred embodiment of the present invention a digital television recording method including broadcasting a television program associated with a broadcaster set of parameters enabling access to a first set of predetermined portions of the program, operating an agent for determining whether to record the program and for associating with the program, upon recording of the program, an agent set of parameters enabling access to a second set of predetermined portions of the program, storing the program together with the broadcaster set of parameters and the agent set of parameters to generate an addressable program, retrieving at least a portion of the addressable program, displaying the at least a portion of the addressable program to a user; receiving from the user a user set of parameters enabling access to a third set of predetermined portions of the addressable program, editing the addressable program to include the user set of parameters enabling access to the third set of predetermined portions of the addressable program thereby generating an edited addressable program, and storing the edited addressable program.

Preferably, the agent set of parameters is operative to override at least a portion of the broadcaster set of parameters. The user set of parameters is preferably operative to override at least one of a portion of the broadcaster set of parameters, and a portion of the agent set of parameters.

Preferably, the broadcaster set of parameters includes a subset of parameters which cannot be overridden by any of the agent set of parameters and the user set of parameters.

Additionally, at least one of the broadcaster set of parameters, the agent set of parameters, and the user set of parameters may include a tag determining at least one of a program retrieval parameter and a content retrieval parameter.

Further additionally, the agent set of parameters includes a recording quality parameter determining a quality of recording of the program. The user set of parameters preferably includes a rating parameter determining a rating of the program as provided by the user.

The television program may include a commercial and the broadcaster set of parameters may include a commercial set of parameters. Preferably, the broadcaster set of parameters includes a parameter determining a request for additional information related to at least one of the commercial and the program. The broadcaster set of parameters also preferably includes a parameter determining expiration of the commercial after a predetermined number of people have seen the commercial or after the user has seen the commercial a predetermined number of times.

Additionally, the broadcaster set of parameters also includes a parameter disabling fast-forward/fast backward browsing through the program.

Alternatively or additionally, the television program includes two separate television programs displayed simultaneously in a picture-in-picture (PIP) mode on a television screen, and the user set of parameters includes a parameter determining a viewing selection for viewing only one of the two separate television programs on the full television screen.

Preferably, the broadcaster set of parameters includes at least one parameter determining at least one of the following information fields: a type of the program; supplementary information accompanying the program; an associated audio channel in a language which differs from a language used in an original audio channel associated with the program; program delete enabled/disabled; parental control associated with at least a portion of the program which requires parental control; an expiration time of the program; picture-in-picture availability; a program title; a time when the program is broadcast; a length of the program; a determination whether the program is encrypted; a compression format of the program; characteristics of the program; cancellation of material already transmitted in the program; selective routing of part of the material to selected users; context specific tagging; and a media item.

Additionally, the agent set of parameters includes at least one parameter determining at least one of the following information fields: a quality of recording of the program; a type of program whose recording is required; at least a title of a favorite program whose recording is required; a time and a date when recording of the program is required; and existence of a review attached to the program; context specific tagging; a media item; and a category of the program.

Further additionally, the user set of parameters includes at least one parameter determining at least one of the following information fields: a program rating provided by the user: a review of the program; a request for additional information relating to the program; a format of the program after editing operations; at least one highlight in the program; compression preferences for compressing the program prior to storage; image manipulation; and video wallpaper selection.

Preferably, the first set of predetermined portions of the program, the second set of predetermined portions of the program, and the third set of predetermined portions of the addressable program include identical portions of the program.

There is also provided, in accordance with a preferred embodiment of the present invention a digital recording method including determining whether to record a program, and recording the program in response to a recording determination at a recording quality determined by a recording quality parameter.

Further in accordance with a preferred embodiment of the present invention there is provided a digital recording method including determining whether to record a program, storing the program in response to a recording determination, and retrieving the program in accordance with a rating given to the program.

There is also provided in accordance with a preferred embodiment of the present invention a digital recording method including determining whether to record a program, storing the program in response to a recording determination, and retrieving the program in accordance with a browsing hierarchy.

Additionally in accordance with a preferred embodiment of the present invention there is provided a digital recording method including determining whether to record a program, recording the program in a circular buffer upon first activation of a freeze selector from a moment of the first activation of the freeze selector, conditionally accessing the program recorded in the circular buffer for retrieval of the program from the circular buffer upon second activation of the freeze selector, and playing the program retrieved from the circular buffer from the moment of the first activation of the freeze selector.

There is also provided in accordance with a preferred embodiment of the present invention apparatus for digital recording of a program including a receiver for receiving the program associated with a broadcaster set of parameters enabling access to a first set of predetermined portions of the program, an agent module operatively associated with the receiver and operative to determine whether to record the program and to associate with the program, upon recording of the program, an agent set of parameters enabling access to a second set of predetermined portions of the program, a memory operatively associated with the agent module and operative to store an addressable program, the addressable program including the program associated with the broadcaster set of parameters and the agent set of parameters, a display operatively associated with the agent module, the receiver and the memory and operative to display at least a portion of the addressable program to a user, an input/output (I/O) interface operatively associated with the agent module and operative to receive from the user a user set of parameters enabling access to a third set of predetermined portions of the addressable program, and a user programming manager operatively associated with the memory, the I/O interface, the agent module, the receiver and the display and operative to generate an edited addressable program by editing the addressable program to include the user set of parameters enabling access to the third set of predetermined portions of the program, and to store the edited addressable program in the memory.

In accordance with a preferred embodiment of the present invention there is also provided apparatus for digital recording of a television program including a processor for determining whether to record the television program, a memory associated with the processor and operative to store the television program in response to a recording determination received from the processor, and a recording quality selector associated with the processor and the memory and operative to select a recording quality parameter determining a quality of storage of the television program in the memory.

Additionally, the apparatus includes a freeze selector operatively associated with the processor, wherein upon a first activation of the freeze selector, the processor is operative to record the program in the memory from a moment of first activation of the freeze selector, and upon a second activation of the freeze selector, the processor is operative to play the program recorded in the memory from the moment of first activation.

Further additionally, the apparatus includes a rating activator associated with the processor and the memory and operative to input information determining a rating given to the program. The apparatus also preferably includes a NEXT key selector associated with the processor and the memory and operative to browse through television programs stored in the memory.

Preferably, the NEXT selector is operative to browse through television programs stored in the memory in accordance with an order determined by at least one of the following: the user; the agent; and the broadcaster. Additionally, the NEXT selector is operative to browse through television programs stored in the memory in accordance with a hierarchy. The hierarchy is preferably determined by at least one of the following: the user; the agent; and the broadcaster.

There is also provided in accordance with a preferred embodiment of the present invention apparatus for digital recording of a television program including a processor for determining whether to record the television program, a memory associated with the processor and operative to store the television program in response to a recording determination received from the processor, and a rating activator associated with the processor and the memory and operative to input information determining a rating given to the television program.

Additionally, the apparatus includes a freeze selector operatively associated with the processor, wherein upon a first activation of the freeze selector, the processor is operative to record the program in a circular buffer from a moment of first activation of the freeze selector, and upon a second activation of the freeze selector, the processor is operative to play the program recorded in the circular buffer from the moment of first activation.

Preferably, the apparatus also includes a NEXT key selector associated with the processor and the memory and operative to browse through television programs stored in the memory.

Further in accordance with a preferred embodiment of the present invention there is also provided apparatus for digital recording of a television program including a processor for determining whether to record the television program, a memory associated with the processor and operative to store the television program in response to a recording determination received from the processor, and a NEXT key selector associated with the processor and the memory and operative to browse through television programs stored in the memory.

There is also provided in accordance with a preferred embodiment of the present invention apparatus for digital recording of a program including a processor for determining whether to record the program, a circular buffer associated with the processor and operative to store the program in response to a recording determination received from the processor, a conditional access module for providing conditional access to the program stored in the circular buffer, and a freeze selector operatively associated with the processor, wherein upon a first activation of the freeze selector, the processor is operative to record the program in the circular buffer from a moment of first activation of the freeze selector, and upon a second activation of the freeze selector, the processor is operative to play the program recorded in the circular buffer from the moment of first activation in accordance with conditions determined by the conditional access module.

Preferably, the conditions determined by the conditional access module include disabling of fast-forward/fast-backward over selected portions of the program.

BRIEF DESCRIPTION OF THE DRAWINGS

The present invention will be understood and appreciated more fully from the following detailed description, taken in conjunction with the drawings in which:

FIG. 1A is a simplified pictorial illustration of a system for playing programs stored and retrieved by digital television recording apparatus, the system being constructed and operative in accordance with a preferred embodiment of the present invention;

FIGS. 3A and 3B together constitute a simplified flow chart illustration of a preferred method of manipulation of television programs recorded in the apparatus of FIGS. 1A and 1B.

DETAILED DESCRIPTION OF A PREFERRED EMBODIMENT

Figure 1B:
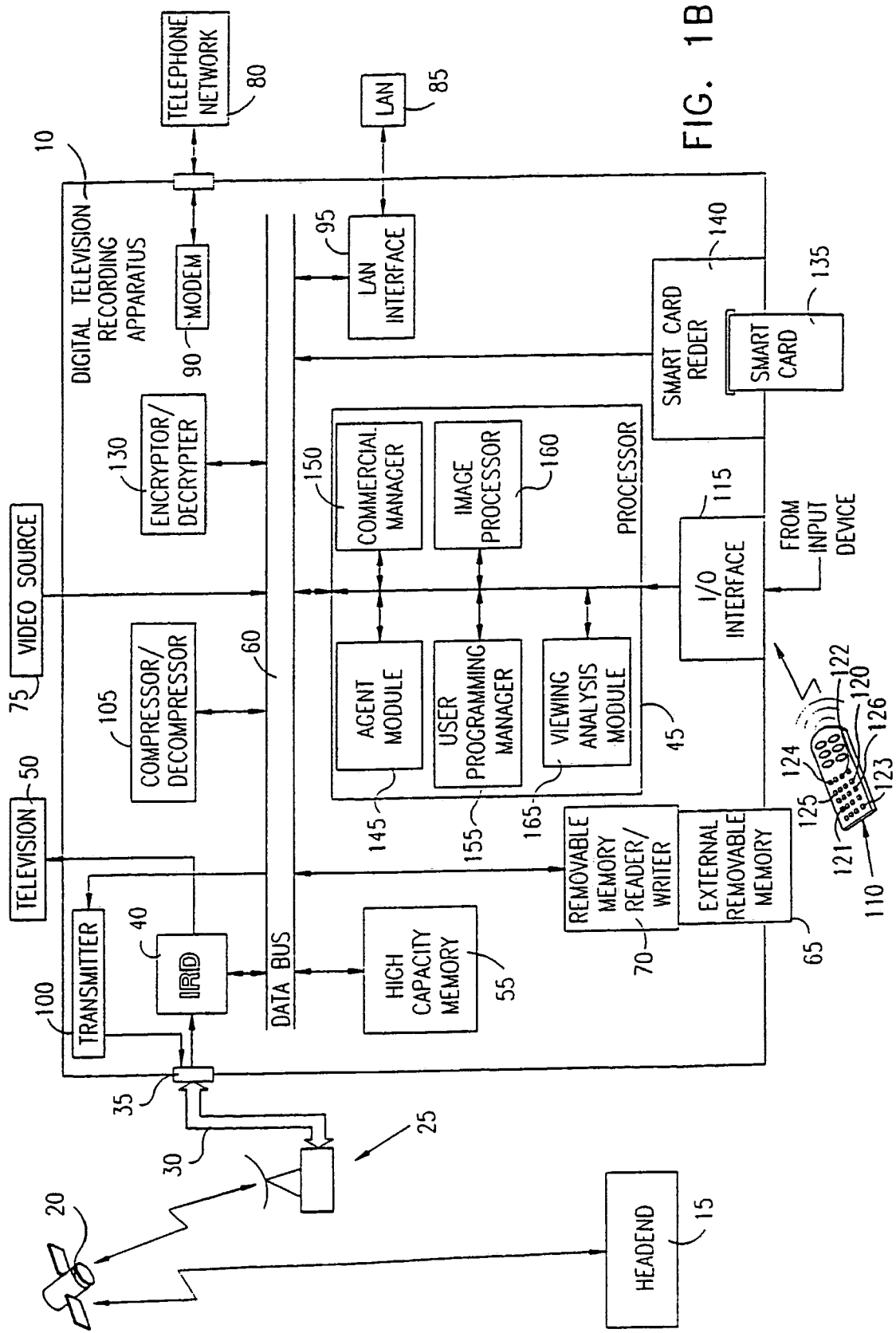
FIG. 1B is a simplified block diagram illustration of digital television recording apparatus in the system of FIG. 1A, the digital television recording apparatus being constructed and operative in accordance with a preferred embodiment of the present invention.

Reference is now made to FIG. 1A which is a simplified pictorial illustration of a system for playing programs stored and retrieved by digital television recording apparatus 10, the system being constructed and operative in accordance with a preferred embodiment of the present invention.

Preferably, the apparatus 10 includes an integrated receiver and agent (IRA) portion 11 and a memory portion 12. The apparatus 10 preferably receives programs from a transmission network and stores the programs in the memory portion 12.

The terms "program" and "television program" are interchangeably used throughout the specification and claims to include various types of transmitted material, such as television programs, commercials, video clips, program guides and electronic program guides (EPGs), data, multimedia information, hypermedia links, computer programs, computer data and applications which may be downloaded, program applets and teletex.

Preferably, the programs may be stored in the memory portion 12 and/or retrieved from the memory portion 12 in accordance with instructions provided by an intelligent agent, generally referred to as an agent, which is resident in the IRA portion 11. The instructions provided by the agent are preferably determined by the agent in accordance with viewing habits of a user learned by the agent.

Preferably, programs retrieved from the memory portion 12 may be displayed on a display 13 which may include any appropriate type of a conventional display. Preferably, the display 13 is operatively associated with the apparatus 10. When a program retrieved from the memory portion 12 is displayed on the display 13, an alert 14 indicating that the program is a stored program may be displayed on the display 13.

Reference is now made to FIG. 1B which is a simplified block diagram illustration of the digital television recording apparatus 10 in the system of FIG. 1A, the apparatus 10 being constructed and operative in accordance with a preferred embodiment of the present invention.

Preferably, the apparatus 10 receives programs from a headend 15 via a satellite 20 or by broadcast. Alternatively, the apparatus 10 may receive programs from a cable headend (not shown).

The television programs are preferably received at an antenna 25 and provided, via a coaxial cable 30 and a connector 35, or any other appropriate conventional means, to the apparatus 10. At the apparatus 10, the television programs are preferably received and decoded in an integrated receiver and decoder (IRD) 40 which preferably includes a conventional IRD.

Preferably, the television programs received at the IRD 40 are tuned to and decoded under control of a processor 45. Decoded television programs are preferably provided, under control of the processor 45, either directly to a television 50 or to a high capacity memory 55 preferably via a data bus 60. It is appreciated that the television 50 may be a preferred type of the display 13 of FIG. 1A.

The high capacity memory 55 may preferably include a conventional high capacity hard disk as used in conventional personal computers or a plurality of high capacity hard disks. It is appreciated that today a conventional computer typically includes a hard disk having a capacity of 2-4 Gigabyte, and hard disks with capacities of 10 Gigabyte are considered today as state-of-the-art. Prototypes of hard disks having higher capacities, such as 100 Gigabyte, are under development today and manufacturers claim availability in the market of 100 Gigabyte hard disks in large quantities by the end of the year 1998.

Typically, a good quality movie of two hours requires a storage capacity of 4 Gigabyte. Thus, a 10 Gigabyte hard disk may typically store two to three full length movies or several typical television shows, each having a length of 30-45 minutes. A 100 Gigabyte hard disk may typically store 20-25 full length movies, or about 100 typical television shows. It is thus appreciated that the high capacity memory 55 may preferably be implemented by a hard disk having a capacity of at least 100 Gigabyte in order to provide good performance of the apparatus 10. However, the capacity of the memory 55 is not meant to be limiting, and the memory 55 may be also implemented by hard disks having capacities lower than 100 Gigabyte.

Alternatively, the high capacity memory 55 may include a plurality of 10 Gigabyte hard disks, such as 10 hard disks, which may together be accessed in order to effectively provide a 100 gigabyte disk space, as is well known in the art.

Preferably, some television programs may be also stored in an external removable memory 65 under control of the processor 45. The external removable memory 65 may include at least one of the following media: a magnetic tape; a CD-ROM (Compact-Disk Read-Only-Memory); a digital video disk (DVD); a write-many read-many compact disk or DVD; and a removable hard disk. The external removable memory 65 is preferably accessible via a removable memory reader and writer 70 which is operatively associated with the data bus 60. It is appreciated that the external removable memory 65 may be used to extend storage capacity of the apparatus 10 so that a plurality of movies may be stored in both the memories 55 and 65. Preferably, the external removable memory 65 may include a recording media changer (not shown) having a plurality of removable memories (not shown) housed in a housing (not shown) and manipulated by a changer robot (not shown).

Preferably, the high capacity memory 55 and the external removable memory 65 may additionally store video and audio information provided by at least one of the following sources: an external video source 75, such as a video camera, a conventional VCR, or an image storage device (not shown); a telephone network 80, which may include a cellular telephone network (not shown); and a local area network (LAN) 85. It is appreciated that the video and audio information provided by the telephone network 80 and the LAN 85 may originate from external sources, such as the World Wide Web (WWW) (not shown), and may be routed to the telephone network 80 and the LAN 85 via networks, such as the Internet (not shown), and a wide area network (WAN) (not shown).

It is appreciated that at least one of the memory 55 and the memory 65 may by divided into two parts: a broadcaster part which may include, for example, commercials which the broadcaster is interested in having a user view; and a user part in which information generated or selected by the user may be stored. It is appreciated that information may be transferred from the user part to the broadcaster part and vice versa.

Preferably, the apparatus 10 communicates with the telephone network 80 via a modem 90 and with the LAN 85 via a LAN interface 95. The video source 75 is typically operatively associated with the processor 45 via the data bus 60. Alternatively, the video source 75 may be associated with an image processor (not shown) which may be operatively associated with the data bus 60.

It is appreciated that the apparatus 10 may also communicate with the headend 15 via one of the telephone network 80 and the LAN 85. Alternatively, the apparatus 10 may communicate with the headend 15 by employing a radio frequency (RF) transmitter 100 for transmitting uplink information via the connector 35, the coaxial cable 30, the antenna 25 and the satellite 20. Preferably, the transmitter 100 may be driven by data provided by the processor 45 via the data bus 60.

Alternatively, the apparatus 10 may communicate with the headend 15 via a Very Small Aperture Terminal (VSAT) as is well known in the art.

The apparatus 10 also preferably includes a compressor/decompressor 105 which is operative to compress/decompress data provided to/retrieved from any one of the memories 55 and 65. The compressor/decompressor 105 is preferably operatively associated with the data bus 60.

Preferably, the apparatus 10 may be operated by the user via a remote control 110, or an input device, such as a keyboard or a mouse (not shown), which may communicate with the apparatus 10 via an input/output (I/O) interface 115. The I/O interface 115 is preferably comprised in the apparatus 10 and is operatively associated with the processor 45. It is appreciated that instructions and selections inputted by the user via the remote control 110 are executed by the processor 45. Preferably, the remote control 110 includes function keys 120, 121, 122, 123, 124, 125 and 126 for operating special functions as described below.

The apparatus 10 also preferably includes an encryptor/decrypter 130 which is operative to encrypt/decrypt data provided to/retrieved from any one of the memories 55 and 65. The encryptor/decrypter 130 is preferably operatively associated with the data bus 60 and is operative with keys or seeds provided by a smart card 135 via a smart card reader 140. It is appreciated that the keys or seeds provided by the smart card 135 may be operative to provide conditional access to and parental control of data stored in the memories 55 and 65.

The term "parental control" is used throughout the specification and claims to include control by a person who has right to control what programs another person, or persons, may view and/or record/delete, and/or otherwise use. For example, and without limiting the generality of the foregoing, parental control is typically used to control programs whose viewing by children requires consent of a parent.

The processor 45 preferably includes the following units: an agent module 145; a commercial manager 150; a user programming manager 155; an image processor 160; and a viewing analysis module 165.

It is appreciated that at least some of the units comprised in the apparatus 10, and especially the compressor/decompressor 105, may be embodied in a general purpose processor, and the general purpose processor may be operative to execute all functions performed by the units in the apparatus 10 which are comprised in the general purpose processor.

The operation of the apparatus 10 of FIGS. 1A and 1B is now briefly described. Preferably, the apparatus 10 may be employed to digitally record television programs provided by the headend 15 in one of the memories 55 and 65. If the IRD 40 includes a plurality of tuners (not shown), the apparatus 10 may be operative to record several programs simultaneously while viewing any program displayed at any channel, wherein the programs may be transmitted over different channels.

It is appreciated that programs may be transmitted during off-peak hours for display later. Preferably, the programs transmitted during off-peak hours may be associated with at least one of the following codes: a time zone code determining a region; a subscriber identification code identifying a digital television recording apparatus; and a blacklist code identifying subscribers in a blackout area in which the programs must be displayed at later hours.

Additionally, programs which are scheduled for display a number of times a day, such as previews, commercials and clips with a channel logo and theme music, or material that is to be displayed in response to defined conditions, may be transmitted only once or preloaded into memory and retrieved in response to an instruction transmitted from the headend 15. Thus, rather than-transmitting the programs which are scheduled for display a number of times a day many times, the programs may be transmitted once, and either instructions to display the programs may be transmitted many times, or an instruction detailing a number of broadcast times may be broadcast once. This allows saving of transmission bandwidth.

Additionally or alternatively, video, audio and control words for a single program need not be transmitted together. For example, if a program is scheduled for transmission with two associated audio channels, a first audio channel including an English version and a second audio channel including a Spanish version, the video portion of the program may be transmitted once and stored in the memory 55. When a particular version is due to be broadcast, such as the English version, the broadcaster may transmit the first audio channel, an instruction to retrieve the video portion from the memory 55, and an instruction to associate the first audio channel with the video portion.

The term "control word" is used throughout the specification and claims to include a control word packet or any appropriate stream of control data/software which is associated with the program or with a portion of the program.

Similarly, the program may be associated with several control words, each corresponding to a different set of on-screen-displays (OSDs), where the OSDs may, for example, include messages in different languages, or with different pricing information depending on when a preview of a Pay-Per-View program is shown. The program may preferably be displayed at different hours with different OSDs.

Additionally, sections of a video portion, an audio portion and/or a control word portion of a program may be broadcast separately. For example, sections of video from the end of the program may be broadcast prior to sections of video from an earlier part of the program, with material from another program in between, and in a different order than that of sections from the audio portion and the control word portion. Additionally, the sections that are broadcast separately may be stored in separate locations in the memory 55 to increase security and to prevent a hacker from decoding a program by detecting a program location in the memory 55.

Further additionally, different sections of the video portion, the audio portion and the control word portion comprised in the program may be transmitted by different transmission sources. This may enhance efficient use of bandwidth and increase security by making it difficult for a hacker to access the program from a single transmission source.

Preferably, the apparatus 10 may be also employed to record programs provided by the video source 75, and programs provided via the LAN 85 and/or the telephone network 80. It is appreciated that the apparatus 10 may operate as a home server for recording/deleting and displaying programs and information generated at various terminals at home and/or provided from networks, such as the Internet.

Additionally, the apparatus 10 may be also employed to transmit programs recorded in one of the memories 55 and 65 to other users, either via a subscriber management system (not shown), or directly to users addresses. Preferably, the programs transmitted to the other users may be transmitted via at least one of the following: the LAN 85; the telephone network 80; and the transmitter 100 or the VSAT. It is appreciated that transmission of programs to the other users and/or reception of programs from any of the other users may require conditional access which may preferably be provided by the smart card 135.

It is appreciated that operations such as recording of programs, retrieval of programs stored in the memories 55 and 65, and deletion of programs stored in the memories 55 and 65 are preferably controlled by the processor 45. The apparatus 10 also preferably enables a variety of additional features such as editing of programs stored in the memories 55 and 65 to include only portions which are of interest to the user.

Another feature available in the apparatus 10 includes freeze of a broadcast television program. In such a case, when the user freezes the program, such as by operating the key 121 on the remote control 110, the program is recorded, for example in the memory 55. When the user unfreezes the program, the apparatus 10 may resume playing the program from the memory 55 rather than from current broadcast of the program. Preferably, the apparatus 10 uses a portion of the memory 55 as a circular buffer and resumes playing the program from the buffer from the point at which the program was frozen. It is appreciated that from that point on, the program is played from the memory 55 in a delayed mode of operation. Thus, the user may stop watching the television program, for example in order to answer to a telephone call, and may resume watching the television program without missing any portion of the program.

It is appreciated that the program may also include marks which are employed to mark portions of the television program that are stored in the circular buffer so that if the user wants to skip some portions of the program to catch-up with the broadcast, the user may input a required mark and jump to the portion marked with the required mark.

It is appreciated that the circular buffer may be controlled by the smart card 135, or any other conventional conditional access module, which provides conditional access to the program stored in the circular buffer. Preferably, the smart card 135 may be operative to disable fast-forward/fast backward operations on the program stored in the circular buffer so that the user is not able to skip portions of the program which are of value to the broadcaster, such as commercials.

It is appreciated that the key 121 may be also operated in a configuration in which the circular buffer is always operative so that a portion of the program, such as the most recently received five minutes of the program, is always stored in the circular buffer. This enables storage of highlights whose viewing may be otherwise missed.

An additional feature available in the apparatus 10 preferably includes display of multiple programs simultaneously on a screen of the television 50. This feature, referred to as picture-in-picture (PIP), may be employed by the user if he does not want to miss programs but has limited time to watch television. Preferably, while watching two programs in a PIP mode, the user may switch between the two programs if he decides to watch only one of the programs on the full television screen. A determination of the program currently watched is preferably provided by the audio currently played.

Alternatively or additionally, in the PIP mode the user may view a premium program on a portion of the television screen without accompanying audio and another program on the rest of the television screen with accompanying audio. In order to see the premium program on the full screen together with the audio, the user may be required to pay for the premium program. Preferably, payment for the program is performed in a conventional method, such as by operating the key 123 on the remote control 110 to accept the program. The payment is preferably handled via the smart card 135.

It is appreciated that at least part of the material received at the apparatus 10 may be compressed and encrypted. In such a case, the material is preferably decompressed at the compressor/decompressor 105 and decrypted at the encryptor/decrypter 130 under control of the smart card 135 as is well known in the art.

Preferably, a program received at the apparatus 10 is associated with a broadcaster set of parameters enabling access to predetermined portions of the program. The broadcaster set of parameters may preferably define the following information which may characterize the program and/or tags which are associated with the program and characterize features of the program:

(1) A type of the program such as a movie, a show, a commercial, and a program provided from the WWW;

(2) supplementary information accompanying the program such as a review of the program as provided by a reviewer, detailed information regarding a product offered by the program, notes accompanying the program, tagged portions of the program, and a percentage of viewers who are currently watching the program;

(3) an associated audio channel in a language which differs from the language used in an original audio channel associated with the program;

(4) program delete enabled/disabled;

(5) parental control associated with at least a portion of the program which requires parental control;

(6) expiration time of the program and/or a number of times the program is watched;

(7) special features, such as PIP availability;

(8) general information, such as a program title, a time when the program is broadcast, a length of the program, a determination whether the program is encrypted and a compression format of the program;

(9) quality and characteristics of material transmitted, such as a data rate, cancellation of material already transmitted such as E-mail, and selective routing of part of the material to selected users;

(10) context specific tagging for use with and/or enhancement of transmitted programs; and

(11) media items, such as WWW content, advertising pointers and pointers to WWW sites.

It is appreciated that the broadcaster set of parameters mentioned above is not meant to be limiting, and it may include additional parameters.

It is further appreciated that not all of the above mentioned parameters must be associated with each program. For example, programs may be transmitted without supplementary information or additional audio channels in various languages.

The parameter of delete enabled/disabled is preferably used mainly in conjunction with commercials as described below or used generally with any type of program. All the other parameters are transmitted as necessary.

It is appreciated that the parameter defining the quality and characteristics of material transmitted may be used, for example, to improve transmission efficiency by transmitting selected information or programs at a higher data rate than other programs which are transmitted at a regular or reduced data rate. It is appreciated that the programs transmitted at a regular or reduced data rate and the programs transmitted at a higher rate may be stored in any of the memories 55 or 65, and upon retrieval from the memories 55 or 65 all the programs may be displayed at conventional frame rates.

The parameter defining context specific tagging for use and/or enhancement of transmitted programs may be used to define specific portions in the programs which may be of special interest to the user, for example, portions in which a favorite actor plays, and portions which may be of special interest to the broadcaster, for example, portions in which a specific product is displayed.

The parameter defining media items, such as WWW content, advertising pointers and pointers to WWW sites may be used to provide the user with direct access to the media items, such as by pointing at a media item.

Preferably, at the apparatus 10, an agent resident in the agent module 145 is operated on the program to determine whether to record the program, for example in the memory 55, and to associate with the program an agent set of parameters enabling access to predetermined portions of the program. The agent preferably learns viewing habits of the user by tracking user's favorite programs and other preferences, such as favorite channels, and main viewing hours. Once user preferences are determined, the agent preferably determines that the program must be recorded if characteristics of the program match the user preferences.

Preferably, if the agent determines that the program must be recorded, the agent may record the program with the agent set of parameters which may be different from the broadcaster set of parameters. It is appreciated that the agent may preferably include an intelligent agent, as described in Israel Patent Application 121230 and corresponding published PCT application WO 99/01984 referred to above, which learns preferences of the user from observed viewing habits of the user, determines preferences of the user, organizes the user preferences in categories in accordance with a user profile, and adjusts the preferences in accordance with continuously evolving viewing habits of the user. It is further appreciated that the agent may be programmable, and the user may determine preferences by entering information which may be used as inputs for the agent.

Preferably, a plurality of agents may be resident in the agent module 145, each being associated with a member of a family of the user. Preferably, each agent may identify a member of the family to which it corresponds according to a code inputted by the member of the family of the user or a biometrics parameter of the member of the family of the user. Alternatively, each member of the family of the user may select a corresponding agent by using a different key on the remote control 110 or by using a different remote control.

Further alternatively, each member of the family of the user may have an individualized smart card, and each agent may be associated with a corresponding smart card. Preferably, agents may be stored in corresponding smart cards or activated by the corresponding smart cards which may include viewing preferences of the members of the family of the user.

It is appreciated that for simplicity, only one agent is referred to herein below, but the number of agents is not meant to be limiting.

Preferably, the agent set of parameters may override at least a portion of the broadcaster set of parameters. For example, if a program is broadcast with two audio channels accompanying the video, the agent may determine that only one of the audio channels must be recorded with the video. Additionally, the agent may record only a portion of the supplementary information accompanying the program. The agent may also determine additional portions of the program which may require parental control and may override options such as "delete enabled" and expiration time if the program is considered a favorite program.

It is appreciated that the agent may be also operative to determine attributes that are not provided by the broadcaster set of parameters. Thus, the agent set of parameters may preferably additionally define some or all of the following information which may characterize the program and/or tags which are associated with the program and characterize features of the program prior to recording and during recording:

(1) a quality of recording of the program;
(2) a type of program whose recording is required;
(3) titles of favorite programs whose recording is required;
(4) a time and a date when recording of programs is required;
(5) existence of a review attached to the program;
(6) additional context specific tagging and/or media items associated with the program, such as WWW pages pointers, games pointers and advertisement pointers; and
(7) a category of the program, such as sports, music, and comedy.

It is appreciated that the above mentioned agent set of parameters is not meant to be limiting, and it may include additional parameters.

It is further appreciated that the agent may typically determine values of the parameters in the agent set of parameters by learning the preferences of the user from observed viewing habits of the user as mentioned above.

Preferably, the quality of recording of the program is determined by the agent prior to recording of the program, and preferably in accordance with the amount of free storage capacity in the memories 55 and 65. Alternatively, the user may select the quality of recording by pressing the key 126 on the remote control 110. It is appreciated that the parameter defining the quality of recording may also preferably include a routing parameter which routes the program to a selected one of the memories 55 and 65.

The parameters indicating the type of program to be recorded, titles of favorite programs whose recording is required, and the time and the date when recording of programs is required may be either programmed by the user or determined by the agent in accordance with viewing habits of the user studied by the agent.

Preferably, the information stored after the operation of the agent includes the program associated with a current set of parameters which includes a combination of the broadcaster set of parameters that were not changed by the agent set of parameters and the agent set of parameters. The program associated with the current set of parameters forms an addressable program, addressable by the user.

Preferably, the user may retrieve from the memory 55 at least a portion of the addressable program in accordance with settings of the current set of parameters. It is appreciated that the at least a portion of the addressable program is retrieved from the memory 55 under control of the smart card 135 which provides conditional access to at least some of the programs stored in the memory 55. The at least a portion of the addressable program which is retrieved from the memory 55 may preferably be selected by the user via the remote control 110 and displayed to the user on the television 50 or on any other conventional display if access to the selected portion of the addressable program is allowed by the smart card 135.

Preferably, the user may edit the at least a portion of the addressable program by inputting a user set of parameters which enable access to predetermined portions of the program. Thus, the user may browse through the program, delete portions of the program or all the program, mark and combine favorite highlights and add information and tags characterizing the program. It is appreciated that during editing the user set of parameters is associated with the addressable program to generate an edited addressable program. Preferably, once program editing is terminated, the user may preferably store the edited addressable program in the memory 55.

It is appreciated that the user set of parameters may override at least one of a portion of the broadcaster set of parameters, and a portion of the agent set of parameters. For example, while editing, the user may decide not to record part of the supplementary information accompanying the program, or to change the expiration time. Additionally, the user may also input additional criteria for parental control or remove some of the parental control criteria transmitted by the broadcaster. Alternatively or additionally, the user may specify parental control of only at least a portion of a movie which requires parental control so that a child may see the movie without the at least a portion defined by the user.

Preferably, the broadcaster set of parameters may include a subset of parameters which cannot be overridden by any of the agent set of parameters and the user set of parameters. It is appreciated that parameters in the subset of parameters which cannot be overridden may include, for example, the type of the program, conditional access information associated with the program and determining conditional access to the program, a basic parental control rating and a "delete disabled" option in case the program is a commercial or a program whose deletion is not permitted. It is further appreciated that the broadcaster may determine additional parameters in the subset of parameters which cannot be overridden.

The user set of parameters may preferably include, in addition to at least some of the broadcaster set of parameters and the agent set of parameters, parameters defining some or all of the following information which may characterize the program and/or tags which are associated with the program and characterize features of the program:

(1) a program rating provided by the user;
(2) a review of the program—selected from a list of available reviews, or printed by the user;
(3) a request for additional information relating to the program, such as hyper links to local and/or remote local sources, information in various multimedia formats, E-mail, commercials, and information related to advertisement;
(4) a format of the program after editing operations such as mixing portions of the program, reordering of portions of the program, and deletion of portions of the program;
(5) preferred highlights, such as a goal in a football game;
(6) compression preferences for compressing the program prior to storage;
(7) image manipulation; and
(8) video wallpaper selection.

It is appreciated that the above mentioned user set of parameters is not meant to be limiting and it may include additional parameters.

It is further appreciated that the program rating may preferably be programmed by the user by entering a rating parameter from an available list of rating parameters. Alternatively, the user may operate the function key 120 in the remote control 110 to input a rating for the program.

Preferably, a review of the program selected by the user may be associated with the program so that the review entered by the user is recorded as part of the program. Alternatively, the user may retrieve the program with a review selected from a list of available reviews. Typically, after viewing the review the user may decide whether to view the program or not.

The request for additional information relating to the program is preferably transmitted to the headend 15, and the headend 15 may preferably transmit the additional information a short time after the request is received.

Alternatively, the additional information related to the program may be transmitted with the program and stored in the memory 55. When the user enters the request for the additional information, the additional information may be retrieved from the memory 55 and displayed on the television 50.

Further alternatively, the additional information may be scheduled for transmission some time after the user enters the request for the additional information. In such a case, the additional information is preferably transmitted on schedule and not immediately at the request of the user. It is appreciated that the additional information may be also transmitted over a different channel, such as a callback channel or an E-mail channel. This is especially suitable in a case where the additional information includes a pointer to the WWW.

Preferably, the format of the program after editing may be used to replace the original format of the program as saved in the memory 55. Thus, after reformatting, the edited addressable program may occupy less memory capacity than the addressable program. It is appreciated that the user may reformat the addressable program so that only the preferred highlights of the program are stored, and the rest of the program is deleted.

The compression preferences may be employed to apply different compression procedures to the program prior to storage. If, for example, the program transmitted is compressed with the conventional MPEG-2 compression procedure, the user may decide to compress the program with an improved compression procedure, such as the MPEG-4.

Preferably, the parameter defining image manipulation may be generated in response to operations performed by the user on video images of the program. For example, the broadcaster may transmit two programs in a PIP mode. In such a case, when the user selects only one of the programs, the image processor 160 is operative to display the program on the whole screen of the television 50.

It is appreciated that image manipulation may also include rotation and translation of images as well as zoom on the images. Preferably, the image manipulation is performed in the image processor 160 using conventional image processing methods.

The parameter defining a video wallpaper selection may be employed to select a video image, or a series of still video images, to accompany audio when an audio channel is selected. For example, the user may select an image of a sunset from a library of video images to accompany love songs provided via an audio channel.

It is appreciated that user editing operations and inputs may be processed in the user programming manager 155. Preferably, user reactions to the program and the rating of the program is analyzed in the viewing analysis module 165 which preferably executes operations and functions similar to those performed in a conventional Nielsen box.

It is appreciated that at least one of the broadcaster set of parameters, the agent set of parameters, and the user set of parameters may preferably include at least one tag determining a program retrieval parameter, and the program may be retrieved by selecting the tag. Additionally, information resident in the program, such as teletex and video images, may be used to create tags according to which the program may be retrieved and manipulated.

Preferably, the at least one tag determining a program retrieval parameter may be generated and associated with the program when the program is stored in the external removable memory 65. In such a case, the at least one tag may include a label including a reference number which may be used to manage a library of external memory devices and to enable the user to locate a program in an external memory device. Preferably, when the user wants to watch a program stored in an external memory device, the user may be prompted to insert an external memory device having an appropriate label. It is appreciated that similar tags may be applied to programs stored in the memory 55.

Preferably, the key 124 on the remote control 110 may be employed by the user as a conventional "ENTER" key to execute an operation or a series of operations preceding operation of the "ENTER" key 124. When the key 124 is pressed after a series of editing operations on a program, the series of editing operations are entered and the program is stored in an edited form.

The key 125 on the remote control 110 may preferably be employed by the user as a "NEXT" button to browse forward through programs stored in any of the memories 55 and 65. If, for example, the user watches a program retrieved from the memory 55 and presses the key 125, the processor 45 preferably accesses a start point of a program which follows the program in the memory 55. It is appreciated that the "NEXT" button may be used to follow programs in accordance with a selected order or a hierarchy. The selected order and the hierarchy are preferably determined by at least one of the following: the user; the agent; and the broadcaster.

Preferably, the "NEXT" key 125 may include a plurality of "NEXT" buttons (not shown), wherein each of the plurality of "NEXT" buttons may be used in association with a hierarchy. Hierarchies may include, for example, a first hierarchy of stories within the program, a second hierarchy of sections within the program, and a third hierarchy of programs of similar type.

When the user browses through the first hierarchy of stories by pressing one of the plurality of "NEXT" buttons, the user may pass, for example, from a first story in a news program to a second story in the news program.

When the user browses through the second hierarchy of sections by pressing another one of the plurality of "NEXT" buttons, the user may pass, for example, from a news section related to politics in the program to a news section related to sports in the program.

When the user browses through the third hierarchy of programs of similar type by pressing yet another one of the plurality of "NEXT" buttons, the user may pass, for example, from a first comedy program to a second comedy program.

It is appreciated that the "NEXT" key 125 may also include a plurality of "PREVIOUS" buttons (not shown), each associated with one of the plurality of "NEXT" buttons, and each operative to browse backward through the programs stored in any of the memories 55 and 65.

Alternatively or additionally, the "NEXT" button may be used to browse through program categories presented via an EPG.

It is appreciated that at least some of the programs may be encrypted. In such a case, the user must insert the smart card 135 in the smart card reader 140 to allow conditional access to and/or retrieval of the encrypted programs. It is appreciated that conditional access via the smart card 135 to access and/or retrieve encrypted programs is preferably performed in one of methods which are well known in the art. It is further appreciated that programs which are transmitted in clear form do not require presence of the smart card 135, unless the smart card 135 is required for a purpose other than decryption.

Alternatively or additionally, the user may be also required to provide an identification, such as by means of the smart card 135, to allow access to a program that is broadcast in clear form. In such a case, if the user does not provide an appropriate identification, or the user is not entitled to watch the program that is broadcast in clear form, an alert indicating that the user is not entitled to access the program may be generated by the processor 45 and displayed on the television 50.

If the program is a commercial it is preferably processed in the commercial manager 150. Preferably, the commercial receives additional attributes which may be used to control distribution and display of the commercial and to provide feedback to advertisers.

Additionally, the commercial may receive attributes which prevent skipping the commercial without viewing it. Alternatively, the user may be required to view a predetermined amount of commercials over a predetermined time period and the commercial may receive attributes determining whether the user has viewed the commercial and a number of times the user has viewed the commercial.

Preferably, the additional attributes are assigned to the commercial by the broadcaster by associating a commercial set of parameters to the commercial in addition to the above mentioned broadcaster set of parameters.

The commercial set of parameters may preferably define the following additional information and/or tags which specifically characterize the commercial:

(1) a time and a date when the commercial is watched;
(2) expiration after a predetermined number of people have seen the commercial;
(3) fast-forward/fast-backward disabled;
(4) additional information regarding a product offered by the commercial; and
(5) targeting information.

It is appreciated that the above mentioned commercial set of parameters is not meant to be limiting and it may include additional parameters.

Preferably, the broadcaster may receive revenues for displaying the commercial in accordance with a time and a date when the commercial is viewed. For example, the broadcaster may receive increased revenues for the commercial if the user watches the commercial at prime time. Thus, the time and the date when the commercial is watched may be associated with a variable revenue rate, where the revenue rate that the broadcaster receives varies with the time of day and the date when the commercial is viewed by the user.

It is appreciated that information regarding the time and the date when the commercial is viewed is preferably analyzed in the processor 45 and transmitted to the headend 15 via an uplink provided by the transmitter 100 or a VSAT. It is further appreciated that the processor 45 may also delete the commercial after the user has seen it a predetermined number of times.

The parameter defining expiration after a predetermined number of people have seen the commercial may be transmitted to the broadcaster via the callback channel and employed by the broadcaster to know, in near real time, the number of people who watch the commercial and to delete the commercial after a predetermined number of people have seen the commercial. The broadcaster may also employ the parameter defining expiration after a predetermined number of people have seen the commercial to provide a proof of exposure to the commercial against which the advertisers typically pay the broadcaster.

Preferably, the parameter disabling the option of "fast-forward/fast-backward" when the commercial is displayed may be employed to prevent situations in which the user watches a movie and skips the commercial, the commercial being preferably associated with the movie. When this parameter is employed, the processor 45 prevents browsing, and the user may either view the commercial or pass to another program.

Preferably, the parameter disabling the option of "fast-forward/fast-backward" when the commercial is displayed may be employed only until the user has seen the commercial a predetermined number of times in a predetermined time period, such as a week, or a predetermined number of commercials in the predetermined time period. It is appreciated that the predetermined number of times that a user must see a commercial may vary from user to user. Similarly, the predetermined number of commercials that a user must see may vary from user to user.

It is appreciated that the parameter disabling the option of fast-forward/fast backward is not employed in a mode in which the user only browses through available programs.

Alternatively, the operations of fast-forward and fast-backward are enabled and the user may be required to pay more money if he does not watch a predetermined number of commercials per a predetermined time period, such as a month.

Preferably, during fast-forward and fast-backward through the program, even when the program is a commercial, a specially prepared meaningful shortened version of a full commercial may be displayed on the television 50. Preferably, each shortened version of a full commercial may last about 3 seconds, and other shortened versions of other commercials may follow until browsing through fast-forward/fast-backward is ended. It is appreciated that the shortened versions of the full commercials are preferably characterized and treated as full commercials.

Preferably, the user may respond to the commercial by requesting additional information regarding the product offered by the commercial. The request for additional information may preferably be inputted by operating the function key 122 in the remote control 110.

The targeting information is preferably employed to define fields of potential interest of the user or a profile of the user. The commercial is preferably transmitted to the user only if the commercial is in a field of interest of the user or matches the user profile. Alternatively, the commercial is always transmitted, but it is stored only if the commercial is in the field of interest of the user or matches the user profile. It is appreciated that targeting criteria may be stored in the smart card 135.

Additionally or alternatively, the targeting information may include a request for payment so that if the commercial is provided as a premium advertisement service, the user may be required to pay for watching the commercial or to pay either less or more for watching video with or without the commercial. If the commercial is not provided as a premium service, the commercial may be broadcast at off-peak hours.

It is appreciated that the commercial manager 150 may also include a statistics manager (not shown) which may provide statistics information, such as the number of times the commercial was viewed by the user, and the commercial manager 150 may display the commercial or delete it based upon the statistics information. Preferably, the statistics information may be transmitted to the headend 15 via the callback channel. Additionally, at least a portion of the statistics information may be displayed to the user.

Preferably, the commercial manager may be employed to control a commercial catalog including of individually customized advertisements.

Figure 2:
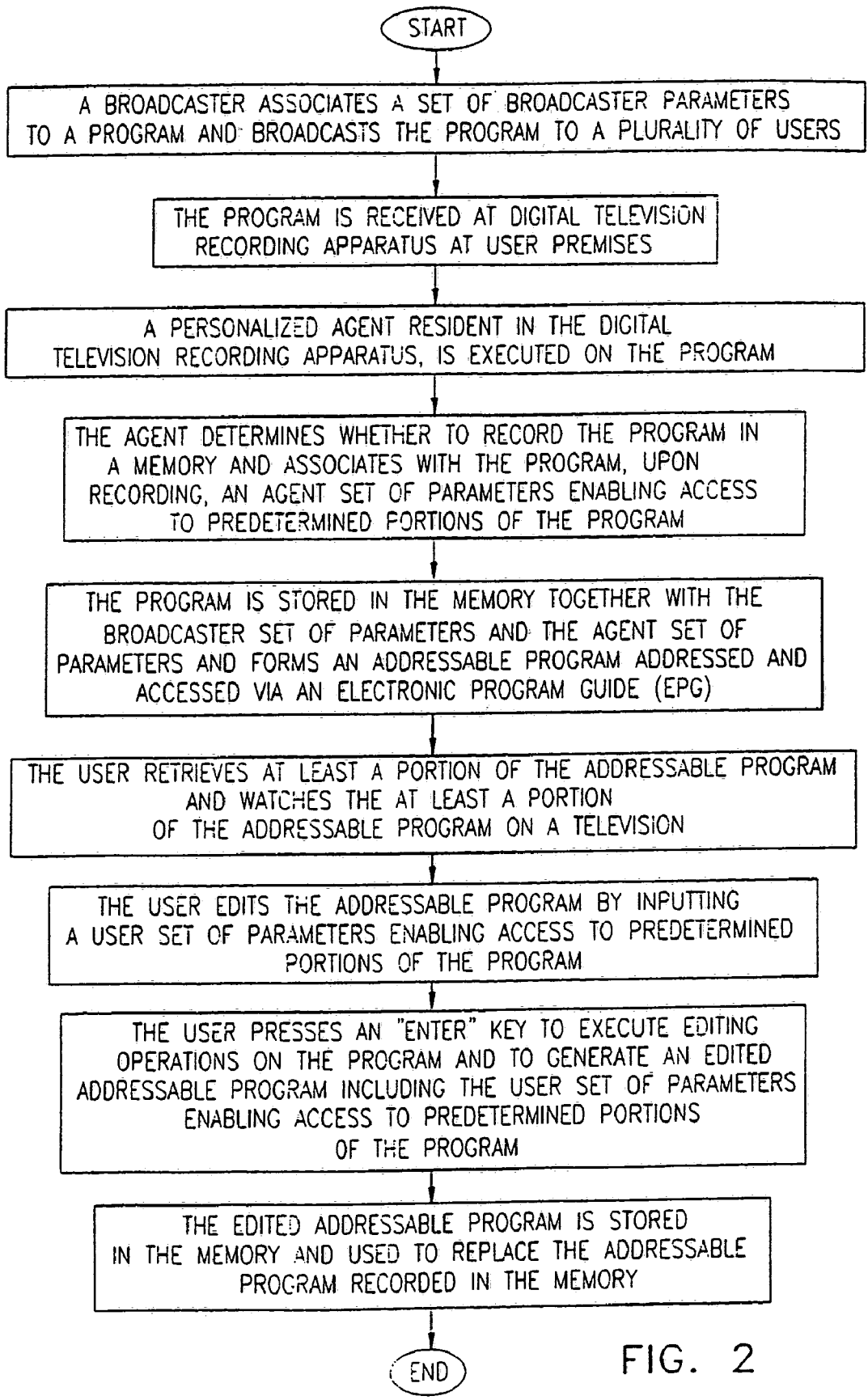
FIG. 2 is a simplified flow chart illustration of a preferred method of operation of the apparatus of FIGS. 1A and 1B.

Reference is now made to FIG. 2 which is a simplified flow chart illustration of a preferred method of operation of the apparatus 10 of FIGS. 1A and 1B.

Preferably, a broadcaster associates a set of broadcaster parameters to a program and broadcasts the program to a plurality of users. It is appreciated that the broadcaster may associate different sets of broadcaster parameters to different programs, and each program may receive a unique set of broadcaster parameters. Each broadcaster set of parameters preferably enables access to predetermined portions of each of the different programs.

Preferably, the program is received at digital television recording apparatus at a user premises. At the apparatus, an agent is executed on an EPG which includes links to the program. The agent is preferably personalized according to viewing habits of the user.

Preferably, the agent determines whether to record the program, for example in a memory, and associates with the program, upon recording, an agent set of parameters enabling access to predetermined portions of the program. It is appreciated that the program is preferably stored together with the broadcaster set of parameters and the agent set of parameters thereby generating an addressable program addressed and accessed via the EPG.

Preferably, the agent may be employed, in association with the EPG, to offer the user programs for viewing in accordance with moods of the user or preferences compiled in accordance with history of viewing habits of the user. The programs offered for viewing may include broadcast programs and programs recorded in the memory. Preferably, the programs offered for viewing may also include programs that the user missed viewing of, the programs being arranged in accordance with a viewing priority determined by at least one of the agent and the user.

It is appreciated that the agent may be also employed, in association with the EPG, to manipulate recording and deletion of programs and to enable programmed recording and deletion. The programmed recording and deletion may include recording/deletion of programs that have been watched, recording of programs that are currently displayed, and recording of programs that are scheduled to be broadcast in the future. It is appreciated that the user may view, via the EPG, a list of all recorded programs. Preferably, the user may also search the list of recorded programs in accordance with different criteria, such as program type and title.

Preferably, the user may retrieve at least a portion of the addressable program and watch the at least a portion of the addressable program on a television. Then, the user may perform editing operations on the addressable program which typically result with an input of a user set of parameters enabling access to predetermined portions of the program. The user set of parameters is preferably received at a processor comprised in the apparatus and when the user presses an "ENTER" key on a remote control the addressable program is edited to generate an edited addressable program including the user set of parameters enabling access to predetermined portions. Preferably, the edited addressable program replaces the addressable program recorded in the memory.

Figure 3B:
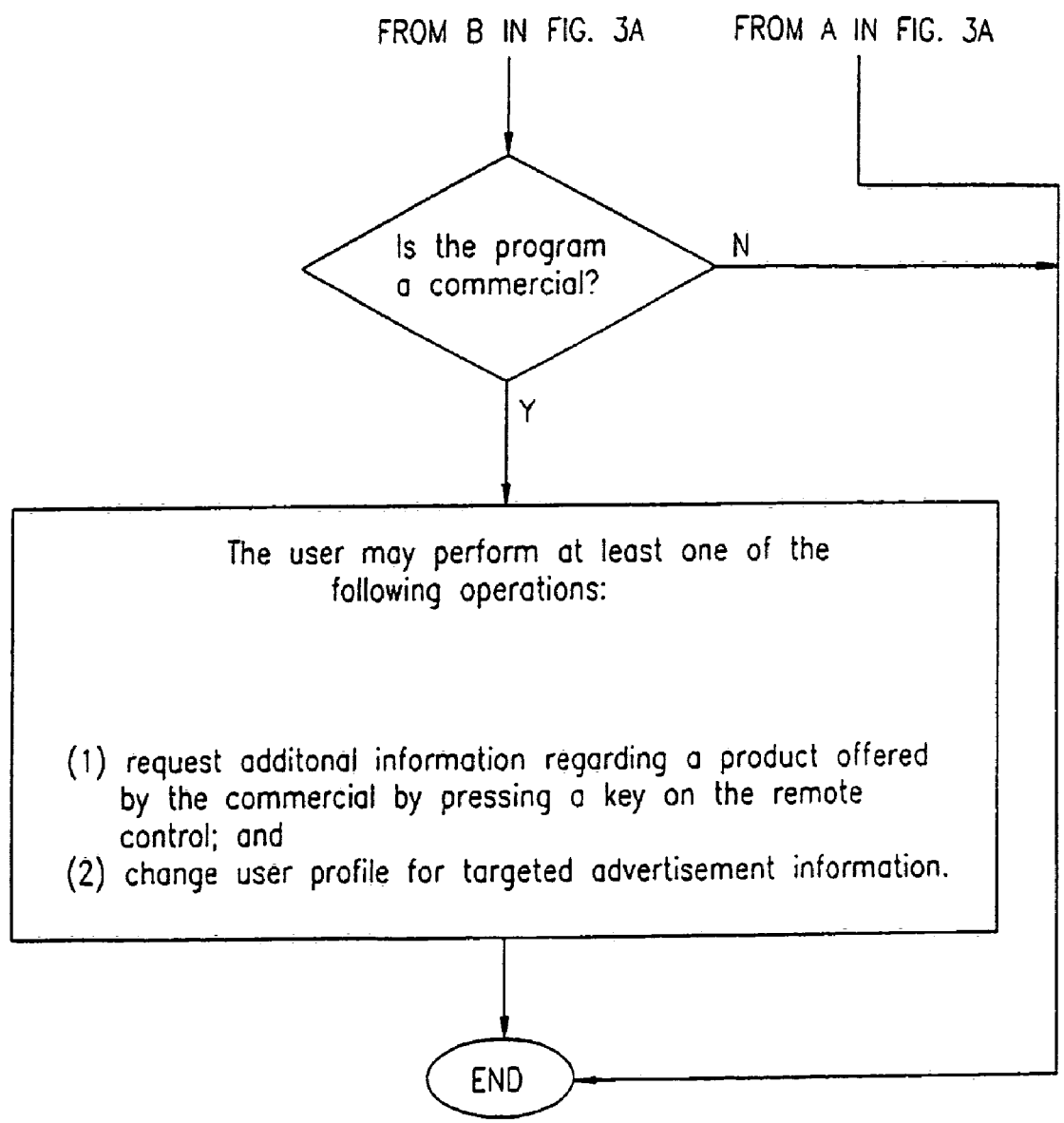

Reference is now made to FIGS. 3A and 3B which together constitute a simplified flow chart illustration of a preferred method of manipulation of television programs recorded in the apparatus 10 of FIGS. 1A and 1B.

Preferably, a user may select viewing a television program broadcast from a headend or a stored television program stored in a memory.

If the user watches a broadcast television program, the user may have, at any time during the broadcast, an option to freeze the program by pressing a freeze key on a remote control. In such a case, the program, starting from the instant the user pressed the freeze key, is recorded in a circular buffer (not shown) which may be comprised in the memory and used to overcome a freeze lag. The circular buffer is preferably loaded and emptied continuously so that when the user presses the freeze key again, the program is retrieved from the buffer which is circularly loaded from the memory and the user may watch the program from the moment the program was frozen.

In a preferred embodiment of the present invention the option to freeze the program may be implemented alone, and not necessarily in combination with other features of the present invention as described herein.

If the user watches the stored television program, the user may edit the program at any time during which the program is played. Preferably, editing of the program may include deletion of parts of the program, combinations of parts of the programs and reordering of the program. Additionally, the user may also combine portions of the program with other programs to create a new program.

Preferably, the user may also perform at least one of the following operations while watching the program by employing the remote control or another appropriate input device:

(1) input a rating by pressing a rating key on the remote control or by typing a rating;
(2) input a review to the program or retrieve a review of the program;
(3) accept a premium program in a PIP mode;
(4) switch to one of a plurality of programs displayed in a PIP mode;
(5) browse through recorded programs or sections of recorded programs by pressing a "NEXT" key on the remote control;
(6) select a program from a menu or an EPG;
(7) select a language for playing the audio, i.e. select one of a plurality of audio channels;
(8) select a quality of recording by pressing a key on the remote control;
(9) change parental control criteria and define portions of the program as locked under a secret code;
(10) program the agent and/or specify recording data, i.e. channels from which to record, either simultaneously or separately, dates and times for recording;
(11) save highlights of the program, for example by pressing an "ENTER" key on the remote control;
(12) select compression format for storage of the program;
(13) program an expiration time for deleting programs when the memory is full;
(14) manipulate images on the television screen, e.g. zoom on an image;
(15) select a video wallpaper; and
(16) tag the program with selected information.

Additionally, if the program is a commercial the user may also perform at least one of the following operations while watching the commercial by employing the remote control or another appropriate input device:

(1) request additional information regarding a product or a program offered by the commercial by pressing a key on the remote control; and
(2) change user profile for targeted advertisement information.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described herein above. Rather the scope of the invention is defined only by the claims which follow:

What is claimed is:

1. A method for use with a transmission system, said transmission system comprising: a headend for transmitting program material including full-length commercials, and a multiplicity of user locations, the method comprising:
receiving at a user location the program material being transmitted from the headend;
receiving at the user location a set of parameters associated with a particular full-length commercial that is included in the program material; the set of parameters comprising a tag that, at least unless certain predetermined conditions exist, disables at least one of a fast-forward mode and a fast-backward mode;
in response to a user requesting one of the fast-forward mode and the fast-backward mode during a portion of the program material, determining whether the tag is associated with the portion of the program material and, if the tag is associated with the portion of the program material, whether the requested mode is disabled; and
if the determining step indicates that the requested mode is not disabled, rendering for display a specially prepared meaningful shortened version of a full-length commercial regardless of whether the portion of the program material is a commercial.

2. The method of claim 1, wherein the tag is not associated with the portion of the program material, and the shortened version is rendered.

3. The method of claim 1, wherein the tag is associated with the portion of the program material but the requested mode is not disabled, and the shortened version is rendered.

4. The method of claim 1, wherein the tag is associated with the portion of the program material and the requested mode is disabled, and the shortened version is not rendered.

5. The method of claim 1, wherein the shortened version has a duration of approximately three seconds.

6. The method of claim 1, said method further comprising: after rendering the shortened version for display, rendering for display other shortened versions of other full-length commercials throughout a duration of the portion of the program material for as long as the requested mode remains requested but not disabled.

7. The method of claim 1, wherein the predetermined conditions are selected from a group consisting of: the particular full-length commercial has been displayed at the user location a predetermined number of times, a predetermined number of commercials has been displayed at the user location during a predetermined time period, the requested mode is requested during browsing through available programs, a cost for receiving the program material is greater if a predetermined number of commercials is not displayed at the user location during a predetermined time period.

8. The method of claim 1, said method further comprising recording commercial playback statistics including incrementing playback data for a specific full-length commercial when a corresponding shortened version of the specific full-length commercial is rendered for display in one of the fast-forward mode and the fast-backward mode.

9. The method of claim 8, further comprising: transmitting the commercial playback statistics to the headend.

10. The method of claim 8, further comprising: rendering for display at least a portion of the commercial playback statistics.

11. The method of claim 8, further comprising: deleting the corresponding shortened version of the specific full-length commercial based upon the commercial playback statistics.

12. A digital television recording apparatus for use with a transmission system, said transmission system comprising: a headend for transmitting program material including full-length commercials, and a multiplicity of user locations, the apparatus comprising:

a receiver operative to receive the program material being transmitted from the headend, and to receive a set of parameters associated with a particular full-length commercial that is included in the program material; the set of parameters comprising a tag that, at least unless certain predetermined conditions exist, disables at least one of a fast-forward mode and a fast-backward mode;

a processor operative to:

in response to a user requesting one of the fast-forward mode and the fast-backward mode during a portion of the program material, determine whether the tag is associated with the portion of the program material and, if the tag is associated with the portion of the program material, whether the requested mode is disabled; and if there is a determination that the requested mode is not disabled, render for display a specially prepared meaningful shortened version of a full-length commercial regardless of whether the portion of the program material is a commercial.

13. The apparatus of claim 12 wherein, in response to the requested mode, the processor is operative to render the shortened version for display, if the tag is not associated with the portion of the program material.

14. The apparatus of claim 12 wherein, in response to the requested mode, the processor is operative to render the shortened version for display, if the tag is associated with the portion of the program material but the requested mode is not disabled.

15. The apparatus of claim 12 wherein, in response to the requested mode, the processor is operative to render the portion of the program material for normal display, if the tag is associated with the portion of the program material and the requested mode is disabled.

16. The apparatus of claim 12, wherein the shortened version has a duration of approximately three seconds.

17. The apparatus of claim 12 wherein, after rendering the shortened version for display, the processor is operative to render for display other shortened versions of other full-length commercials throughout a duration of the portion of the program material for as long as the requested mode remains requested but not disabled.

18. The apparatus of claim 12, wherein the predetermined conditions are selected from a group consisting of: the particular full-length commercial has been displayed at a user location a predetermined number of times, a predetermined number of commercials has been displayed at the user location during a predetermined time period, the requested mode is requested during browsing through available programs, a cost for receiving the program material is greater if a predetermined number of commercials is not displayed at the user location during a predetermined time period.

19. The apparatus of claim 12, further comprising a statistics manager operative to record commercial playback statistics including incrementing playback data for a specific full-length commercial when a corresponding shortened version of the specific full-length commercial is rendered for display in one of the fast-forward mode and the fast-backward mode.

20. The apparatus of claim 19, further comprising a transmitter operative to transmit the commercial playback statistics to the headend.

21. The apparatus of claim 19, wherein the processor is operative to render for display at least a portion of the commercial playback statistics.

22. The apparatus of claim 19, further comprising a commercial manager operative to delete the corresponding shortened version of the specific full-length commercial based upon the commercial playback statistics.

\* \* \* \* \*